United States Patent [19]

Ikeda et al.

[11] Patent Number: 5,708,826
[45] Date of Patent: Jan. 13, 1998

[54] APPARATUS AND METHOD FOR CONVERTING PRESENTATION DATA

[75] Inventors: Hisayoshi Ikeda; Eiji Kinoshita; Keiko Takeda; Nahoko Mase, all of Kawasaki, Japan

[73] Assignee: Fujitsu Limited, Kawasaki, Japan

[21] Appl. No.: 581,291

[22] Filed: Dec. 29, 1995

[30] Foreign Application Priority Data

May 16, 1995 [JP] Japan ................. 7-116689

[51] Int. Cl.⁶ .................................. G06T 1/00
[52] U.S. Cl. .................. 395/762; 395/785; 395/348; 395/352; 395/354; 395/334; 395/774
[58] Field of Search .................. 395/761, 762, 395/763, 774–779, 784–785, 788, 806–807, 326, 329, 333–335, 339, 348–349, 352–354, 200.01; 364/514 A

[56] References Cited

U.S. PATENT DOCUMENTS

| | | | |
|---|---|---|---|
| 5,408,659 | 4/1995 | Cavendish et al. | 395/762 X |
| 5,428,731 | 6/1995 | Powers, III | 395/762 X |
| 5,432,904 | 7/1995 | Wong | 395/762 X |
| 5,526,520 | 6/1996 | Krause | 395/762 X |
| 5,530,852 | 6/1996 | Meske, Jr. et al. | 395/762 X |
| 5,551,055 | 8/1996 | Matheny et al. | 395/882 |
| 5,553,221 | 9/1996 | Reimer et al. | 395/762 X |
| 5,632,022 | 5/1997 | Warren et al. | 395/350 |
| 5,640,553 | 6/1997 | Schultz | 395/605 |
| 5,655,084 | 8/1997 | Pinsky et al. | 395/203 |

OTHER PUBLICATIONS

Ahlberg et al, "IVEE: An Information Visualization & Exploration Environment", Infrmation Visualization, 1995 Conference, IEEE, pp. 66–73, 1995.

Lau, "Building a hypermedia information system on the Internet", Professional Communication Conference, 1994 (IPCC 94), pp. 192–197, 1994.

Moeller, "Startup takes guesswork of Web creation", PC Week, v12 n38, pp. 75–76, Sep. 1995.

"Publishing on the eWorld Wide Web", The Seybold Report on Publishing Systems, v25 n1, pp. 8–18, Sep. 1995.

"Highlights from the exhibition", The Seybold Report on Publishing Systems, v25 n2, pp. 10–40, Sep. 1995.

Primary Examiner—Joseph H. Feild
Attorney, Agent, or Firm—Staas & Halsey

[57] ABSTRACT

Picture plane data of a picture plane file is converted to picture plane data of a GIF file format on a frame unit basis by a picture plane data forming module. A list display picture plane in which a plurality of miniature picture planes are arranged is formed from scenario data and the image data of all frames by a list display picture plane forming module. Further, on the basis of the scenario data of a scenario file, a frame converting module forms scenario data of an HTML file format for switching to each frame picture plane by the selection of the miniature picture plane in the list display picture plane and the switching among the frame picture planes.

34 Claims, 13 Drawing Sheets

FIG. 6

```
1 <title> 1/6 </title>
2 <!Create Date:1995-04-12>
3 <a href="den_002.html">
4 <IMG ALT=" [Image]" SRC="teian90.gif">
5 </a>
6 <BR>
7 <p>
8 <IMG ALT=" [    ]" SRC="btn_void.gif">
9 <a href="den_002.html"><IMG ALT="[Next]"SRC="btn_next.gif></a>
10 <a href="den_m001.html"><IMG ALT="[Menu]"SRC="btn_menu.gif></a>
11 <a href="DENDEM01.html"><IMG ALT="[Exit]"SRC="btn_exit.gif></a>
```

FIG. 7

```
1 <title> 2/6 </title>
2 <!Create Date:1995-04-12>
3 <a href="den_003.html">
4 <IMG ALT=" [Image]" SRC="teian90.gif">
5 </a>
6 <BR>
7 <p>
8 <a href="den_001.html"><IMG ALT="[Prev]"SRC="btn_prev.gif></a>
9 <a href="den_003.html"><IMG ALT="[Next]"SRC="btn_prev.gif></a>
10 <a href="den_m001.html"><IMG ALT="[Menu]"SRC="btn_prev.gif></a>
11 <a href="DENDEM01.html"><IMG ALT="[Exit]"SRC="btn_exit.gif></a>
```

FIG. 8

| FUNCTIONS TO BE USED | GENERAL FORMS OF HTML AND EXAMPLES OF DESCRIPTION |
|---|---|
| SETTING OF TITLE OF HTML (DISPLAYED ON TITLE COLUMN OF WWW RETRIEVING TOOL) | <title> CHARACTER TRAIN OF TITLE </title><br>(EXAMPLE) <title> Page01 </title> |
| DESCRIPTION OF NOTES (NOT DISPLAYED ON DRAWING) | <! NOTES><br>(EXAMPLE) <! DATE 1995-04-01> |
| CHARACTER TRAIN(WITH UNDER LINE)DISPLAYED ON DRAWING IS CLICKED AND THE DESIGNATED HTML FILE IS CALLED | <a href="HTML FILE NAME WHICH IS CALLED, HTML"> CHARACTER EXAMPLE </a><br>(EXAMPLE) <a href="COMPANY1.HTML"> COMPANY INTRODUCTION </a> |
| IMAGE DISPLAYED ON DRAWING IS CLICKED AND THE DESIGNATED HTML FILE IS CALLED (IN THE SYSTEM WHICH CANNOT DISPLAY IMAGE, ALTERNATIVE CHARACTER TRIN IS DISPLAYED IN PLACE OF IMAGE) | <a href="HTML FILE NAME WHICH IS CALLED, HTML"><br><IMG ALT="[ALTERNATIVE CHARACTER TRAIN OF IMAGE]" SRC="IMAG FILE NAME, CIF"></a><br>(EXAMPLE) <a href="COMPANY1.HTML"><br><IMG ALT="[Image]"<br>SRC="SCENE OF HEAD OFFICE.CIF"></a> |
| NEW-LINE DESIGNATION | <BR> |
| PARAGRAPH CHANGE | <P> |

FIG. 12

```
<tite> MENU 1/1 </title>                                            140
<DATE OF CREATED:1995-04-12>
```
```
<a href="den_001.html">                                             142
<IMG ALT=" [Image m001]" SRC="den_m001.gif">
</a>
```
```
<a herf="den_002.html">                                             144
<IMG ALT=" [Image m002]" SRC="den_m002.gif">
</a>
```
```
<a herf="den_003.html">                                             146
<IMG ALT=" [Image m003]" SRC="den_m003.gif">
</a>
```
```
<a herf="den_004.html">                                             148
<IMG ALT=" [Image m004]" SRC="den_m004.gif">
</a>
<BR>
```
```
<a href="den_005.html">                                             150
<IMG ALT=" [Image m005]" SRC="den_m005.gif">
</a>
```
```
<IMG ALT=" [    ]" SRC="btn_void.gif">                              152
<IMG ALT=" [    ]" SRC="btn_void.gif">
<a herf="DENDEMO.1html"><IMG ALT="[Exit]" SRC="btn_exit.gif"></a>
```

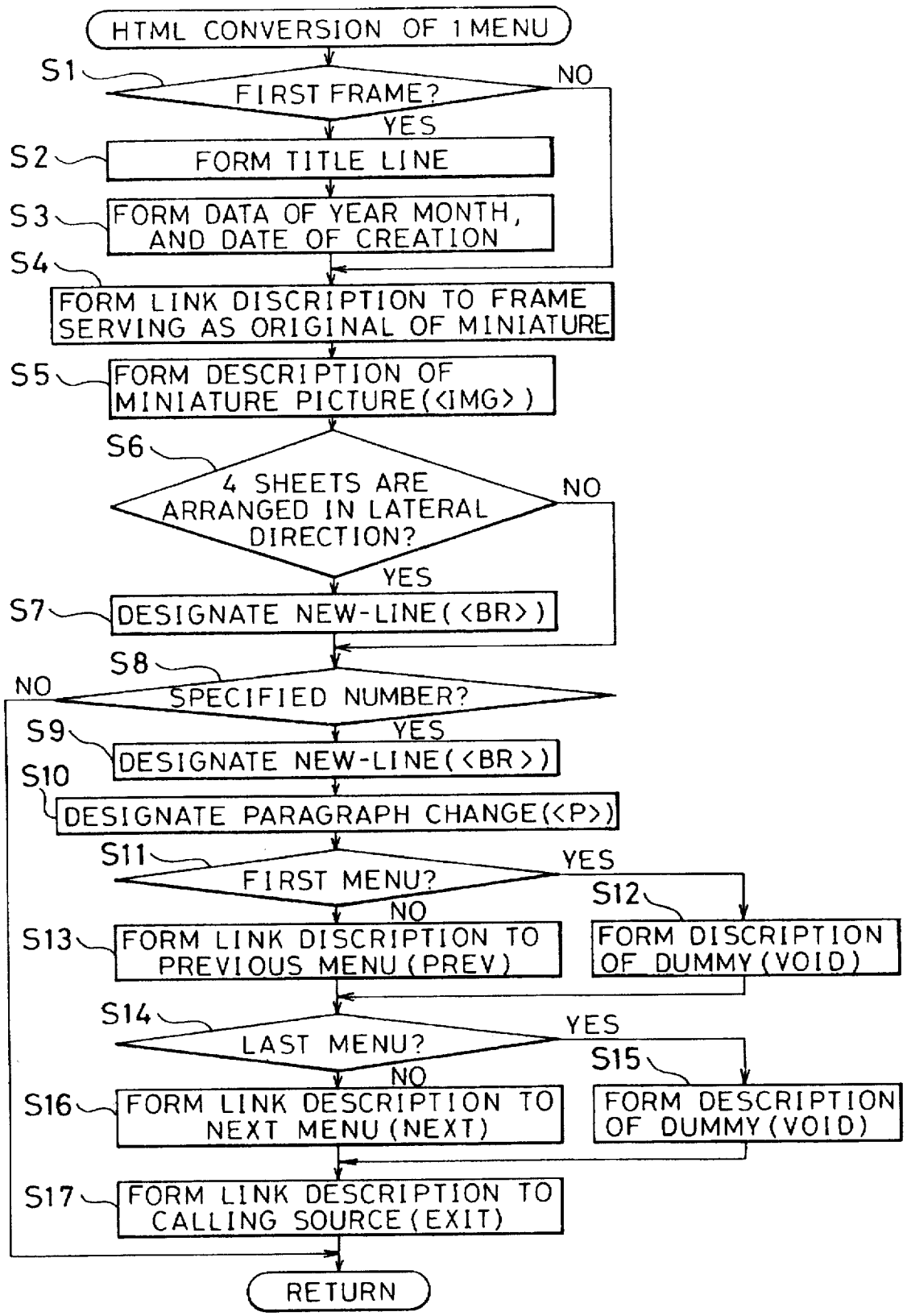

APPARATUS AND METHOD FOR CONVERTING PRESENTATION DATA

BACKGROUND OF THE INVENTION

The present invention relates to apparatus and method for converting presentation data of a peculiar binary file format including image data formed by a personal computer and scenario data of its display procedure into data of a text file format which can be generally used. More particularly, the invention relates to apparatus and method for converting presentation data of a binary file format together with image data into data of a text file format described by a hyper text markup language (hereinafter, abbreviated to "HTML") which can be used the Internet.

In recent years, in association with the spread of a personal computer corresponding to a multimedia, a software tool for forming presentation data in which image data such as characters, still image, and the like and a plurality of kinds of data such as audio data and the like has been provided. By using such a presentation tool, background music and effective sounds and, further, powerful motion images are combined and an impressive presentation can be performed at a lecture meeting, an exhibition, an announcement meeting, a showroom, or the like. Further, if the presentation data formed by the presentation tool is converted to a text file and can be provided to the internet having a worldwide scale, a utilization of a further effective presentation can be expected. However, the presentation tool which is used in an operation environment that is peculiar to the apparatus such as a personal computer or the like handles the data of the binary file format which is individually peculiar. In order to provide it as information onto the internet, the data has to be described in accordance with the HTML used in a WWW (World Wide Web) server which registers information including a multimedia and provides to each user. Therefore, in the conventional presentation tool, it is necessary that the display contents on a presentation picture plane are manually converted to an image data file of a different size every picture plane and, further, the user describes a file name of the image data to be used in the HTML data for scenario formed every picture plane. The converting works are troublesome. Further, in order to form an image data file, it is troublesome because another software tool is needed to obtain the picture plane contents displayed by the presentation tool. The user needs an expert knowledge with respect to a grammar such as an HTML or the like for conversion. Everybody cannot always execute the converting works. When the presentation is executed on the personal computer, a visual menu picture plane (list display picture plane) in which a plurality of presentation picture planes are reduced and arranged is used and it is possible to arbitrarily move to a necessary presentation picture plane by clicking a mouse. Such a visual menu picture plane cannot be realized on the network. Further, in case of providing the presentation on the internet, it is necessary to insert a copyright display to each of the presentation picture plane in order to prepare for the case where the presentation is retrieved from a country in which it is necessary to clearly display the copyright. With respect to the copyright display, however, there is a difficulty such that a provision to the internet has to be previously added at the stage of the original data before converting to the network.

SUMMARY OF THE INVENTION

According to the invention, there are provided converting apparatus and method of presentation data, in which even if the user doesn't have an expert knowledge such as an HTML or the like, presentation data constructed by image data formed by a computer and scenario data can be automatically converted to the image data and scenario data of a file format which can be provided onto a network such as an internet or the like, for example, in a manner such that the image data is converted to the data of a GIF file format and the scenario data is converted to an HTML file format.

First, the invention relates to a converting apparatus of presentation data, in which presentation data constructed by a plurality of picture plane data formed by a presentation forming apparatus such as a personal computer or the like and scenario data in which an instruction to display a list of the plurality of picture planes and a procedure to display the picture plane data have been stored is converted to a data format which is used on a network constructed by a text in which information that hierarchically defines the relations among the plurality of picture plane data has been stored. Specifically speaking, as for the picture plane data formed by the computer and the scenario data, the image data is converted to a GIF file format which can be used on an internet and the scenario data is converted to an HTML file format which can be used on the internet, thereby enabling those data to be provided to a WWW server of the internet. As picture plane data, there are two cases such as case of where the picture plane data is constructed by only the image data and case where the picture plane data is constructed by both of the image data and the character data.

As such a converting apparatus of the presentation data, the invention has a picture plane data forming module, a list display picture plane forming module, and a frame converting module. On the basis of the picture plane data of an original, the picture plane data forming module forms picture plane data having a size designated on a unit basis of a frame that can be used on the network. The list display picture plane forming module forms the image data of a list display picture plane (hereinafter, referred to as a "menu picture plane") on the basis of instruction information to display a list of a plurality of picture planes in the scenario data. On the basis of procedure information to display the picture plane data in the scenario data, the frame converting module forms text data (frame scenario data) which is used on the network having a file name to call each picture plane and link information to another picture plane with respect to a plurality of picture planes and the list display picture plane formed by the list display picture plane forming module.

The frame converting module forms a file name, as necessary, to display an image of an operation button which links to each of a previous picture plane (PREV), a next picture plane (NEXT), a menu picture plane (MENU), and a calling source side picture plane (EXIT) as link information to another frame picture plane. Specifically speaking, in case of the first frame, a file name to display an image of the operation button which links to each of the next picture plane (NEXT), menu picture plane (MENU), and calling source side picture plane (EXIT) is formed. Since the previous picture plane (PREV) doesn't exist, however, a dummy file name to display nothing is formed with regard to the image of the operation button of the previous picture plane. In case of the final frame, a file name to display an image of the operation button which links to each of the previous picture plane (PREV), menu picture plane (MENU), and calling source side picture plane (EXIT) is formed. Since the next picture plane (NEXT) doesn't exist, however, with respect to the image of the operation button of the next picture plane (NEXT), a dummy file name to display nothing is formed. The list display picture plane forming module comprises: a miniature picture plane converting module for converting each picture plane before conversion to image data of a miniature picture plane which can be arranged on the list display picture plane; and a list display converting module for forming text data (menu scenario data) including a file name to arrange and display a plurality of miniature picture planes onto the list display picture plane on the basis of the instruction information to display a list of a plurality of picture planes in the scenario data, link information onto a frame picture plane to which each miniature picture plane links, and link information to another list display picture plane. As link information to the frame picture plane to which the miniature picture plane links, an image file name to display the image data onto the frame picture plane is formed and when a portion of the miniature picture plane is clicked, the image data which is designated by the image file name is read out and displayed. The list display converting module forms a file name, as necessary, of the image of the operation button which links to each of the previous menu picture plane (PREV), next menu picture plane (NEXT), and calling source side picture plane (EXIT) as link information of the menu picture plane. In this case, when the number of miniature picture planes arranged on the menu picture plane exceeds a predetermined number, for example, 16, another menu picture plane is formed. Further, in case of the first menu picture plane, the list display converting module forms a file name to display the image of the operation button which links to the calling source side picture plane (EXIT). However, since the previous menu picture plane (PREV) doesn't exist, with respect to the images of the operation buttons which link to them, a dummy file name to display nothing is formed. In case of the final menu picture plane, a file name to display the image of the operation button which links to each of the previous menu picture plane (PREV) and calling source side picture plane (EXIT) is formed. Since the next menu picture plane (NEXT) doesn't exist, however, with regard to the image of the operation button which links to it, a dummy file name to display nothing is formed.

Further, the converting apparatus of the invention has a conversion parameter setting module to set various parameters which are necessary for conversion onto the picture plane. The conversion parameter setting module performs: a conversion destination file name designation to designate at least the converted file name; a conversion destination designation to designate a directory to preserve converted data; a calling source side designation to designate a file name on the calling source side; an image size designation to designate a display size of a converted image; an operation designation to designate an operation for start, interruption, end, or the like of the conversion; and an alternating name designation to designate a character train which is used for alternately displaying an image. Further, the conversion parameter setting module can also execute an audio file designation to designate an extension of an audio file which is reproduced by the picture plane of each frame and a button set selecting designation to select the kind of image of the operation button which is used to link to the frame picture plane. Further, the converting apparatus of the invention has an image synthesizing module for synthesizing image data of new information whose addition is instructed when the picture plane data is converted by the picture plane data converting module. The image synthesizing module reads out the additional information stored in an image synthesis file which has been prepared and synthesizes to the image data of the frame picture plane. For example, copyright information about the image data of the picture plane is synthesized.

The invention also provides a converting method of presentation data, whereby presentation data constructed by a plurality of picture plane data formed by a presentation forming apparatus and scenario data in which an instruction to display a list of a plurality of picture planes and a procedure to display the picture plane data have been stored is converted to a data format which is used on a network that is constructed by a text in which information which hierarchically defines the relations among the plurality of picture plane data has been stored. The converting method comprises:

a picture plane data forming step of forming picture plane data on the network on the basis of a plurality of picture plane data before conversion;

a list display picture plane forming step of forming image data of a list display picture plane (menu picture plane) on the basis of instruction information to display a list of a plurality of picture planes in the scenario data; and a frame converting step of forming text data which is used on the network having a file name to call each picture plane data and link information to another picture plane with respect to the plurality of picture planes and a list display picture plane formed in the list display picture plane forming step on the basis of the procedure information to display the picture plane data in the scenario data.

According to the converting apparatus and method of presentation data of the invention as mentioned above, for example, even if the user doesn't have an expert knowledge such as HTML or the like as a language of the file format which can be used in the WWW server of the internet, the presentation data formed by the computer can be easily converted to the data of the HTML file format while including the menu picture plane of a visual list display. Upon conversion, although it is necessary to set fundamental parameters, any expert knowledge is unnecessary to set the parameters and the converting work can be easily executed. Further, since an editing function which can synthesize a copyright display or the like into the image during the converting process is provided, when developing to the internet, necessary information can be easily added.

The above and other objects, features, and advantages of the present invention will become more apparent from the following detailed description with reference to the drawings.

BRIEF DESCRIPTION OF THE DRAWINGS

FIG. 6 is an explanatory diagram of HTML frame scenario data converted from the first frame in FIG. 5;

FIG. 7 is an explanatory diagram of HTML frame scenario data converted from the second frame in FIG. 5;

FIG. 8 is an explanatory diagram of a fundamental HTML grammar and terminology which are used in the invention;

FIG. 12 is an explanatory diagram of an HTML menu scenario data converted from the SW3 scenario data in FIG. 5;

FIG. 14 is a flowchart for conversion to the HTML menu scenario data of one menu according to the invention.

DETAILED DESCRIPTION OF THE PREFERRED EMBODIMENT

Figure 1:
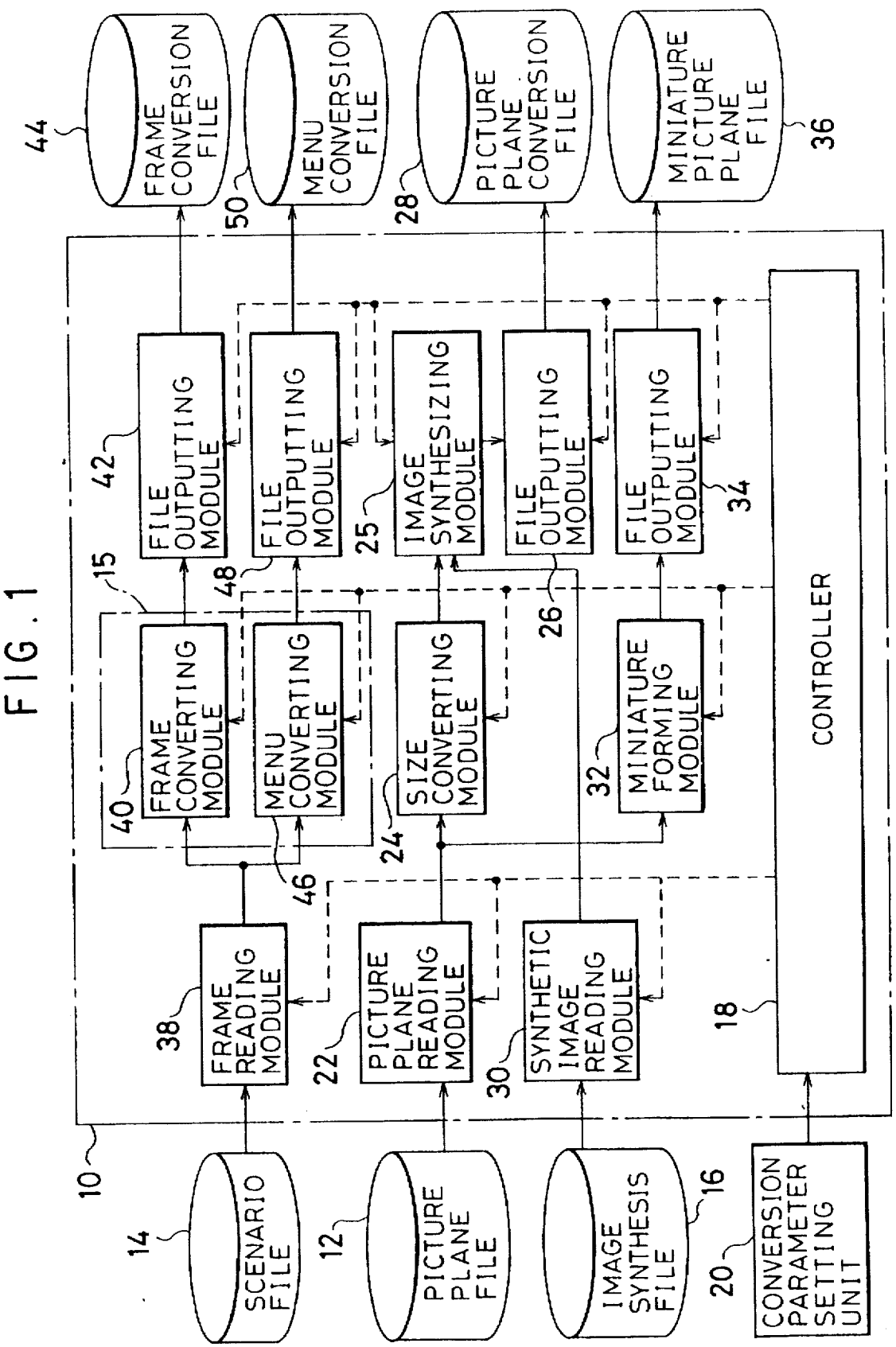
FIG. 1 is a block diagram of a converting function of the present invention.

FIG. 1 is a functional block diagram of an apparatus for converting presentation data of the invention. According to the apparatus of the embodiment, presentation data constructed by picture plane data formed by a personal computer and scenario data is converted to a file format which can be used by a WWW server as a server to register information including a multimedia on an internet and provide to the user. Namely, the picture plane data is converted to a GIF file format and the scenario data is converted to an HTML file format. Although a case of handling only the image data as picture plane data will be explained as an example hereinbelow, both of image data and character data can be also included in the picture plane data as necessary.

First, the presentation data formed by the personal computer is constructed by a plurality of presentation picture planes and scenario data describing a displaying order (publishing order) of them. The image data providing each presentation picture plane is stored in a picture plane file 12. The scenario data describing the displaying procedure of the plurality of presentation picture planes is stored in a scenario file 14. Further, audio data is combined to each presentation picture plane by an audio file (not shown) as necessary. One presentation picture plane is managed on a frame unit basis. Image data for displaying a picture plane is included in one frame. Audio data is included in the frame as necessary. Therefore, the scenario data designates image data or audio data of a plurality of frames and controls a whole flow of the presentation. As a file format of the picture plane file 12 before conversion, any one of a CT3 file, a BMP file, a DIB file, a GIF file, a JPEG file, a PCX file, a TIFF file, and a TGA file is used. For example, an SW3 file is used as a file format of the scenario file 14. Each of the above files will now be briefly explained as follows.

CT3 file:
File format of a drawing tool "NEKO" of a Den International which is commercially available by Fujitsu Ltd.

BMP file (Bit Map File):
File format of graphics which is used in the Windows of Microsoft Co., Ltd.

GIF file (Graphics Interchange Format):
File format of graphics determined by the CompuServe of a major network of the U.S.A.

JPEG file (Joint Photographic Experts Group File):
File format as a standard use format which relates to a compression of a still image of a natural image and which has been defined in cooperation of the CCITT and the ISO PCX file:
File format of the Paint Brush as a famous software on the DOS TIFF (Tagged Image File Format):
File format of graphics formed by Aldus Co., Ltd. of the U.S.A.

TGA file (Targa Image File):
File format of Truevision Co., Ltd. of a graphics adapter source SW3 file (Scenario File):
File format of a presentation scenario of Den International which is commercially available by Fujitsu Ltd.

A conversion processing unit 10 has a controller 18, reads the scenario file 14 and picture plane file 12 on the basis of parameter set information on the picture plane by a conversion parameter setting unit 20, converts the scenario data into scenario data of an HTML file format which can be provided to the WWW server, and converts the picture plane data into image data of the GIF file format. The conversion of the scenario data of the HTML file format is separately executed with respect to the conversion to frame scenario data about each frame picture plane and the conversion to menu scenario data about a menu picture plane serving as a list display picture plane in which a plurality of miniature picture planes are arranged. To convert the image data of each frame picture plane stored in the picture plane file 12, a picture plane reading module 22, a size converting module 24, and a file outputting module 26 are provided. The size converting module 24 converts to image data of the GIF file format of a dot size designated by the conversion parameter setting unit 20 and stores into picture plane conversion file 28 on a frame unit basis. For the conversion system of the image data, according to the invention, a necessary image can be newly synthesized at the stage of the converting process. In the case where the original image data has the GIF file format, only the size is changed.

Figure 2:
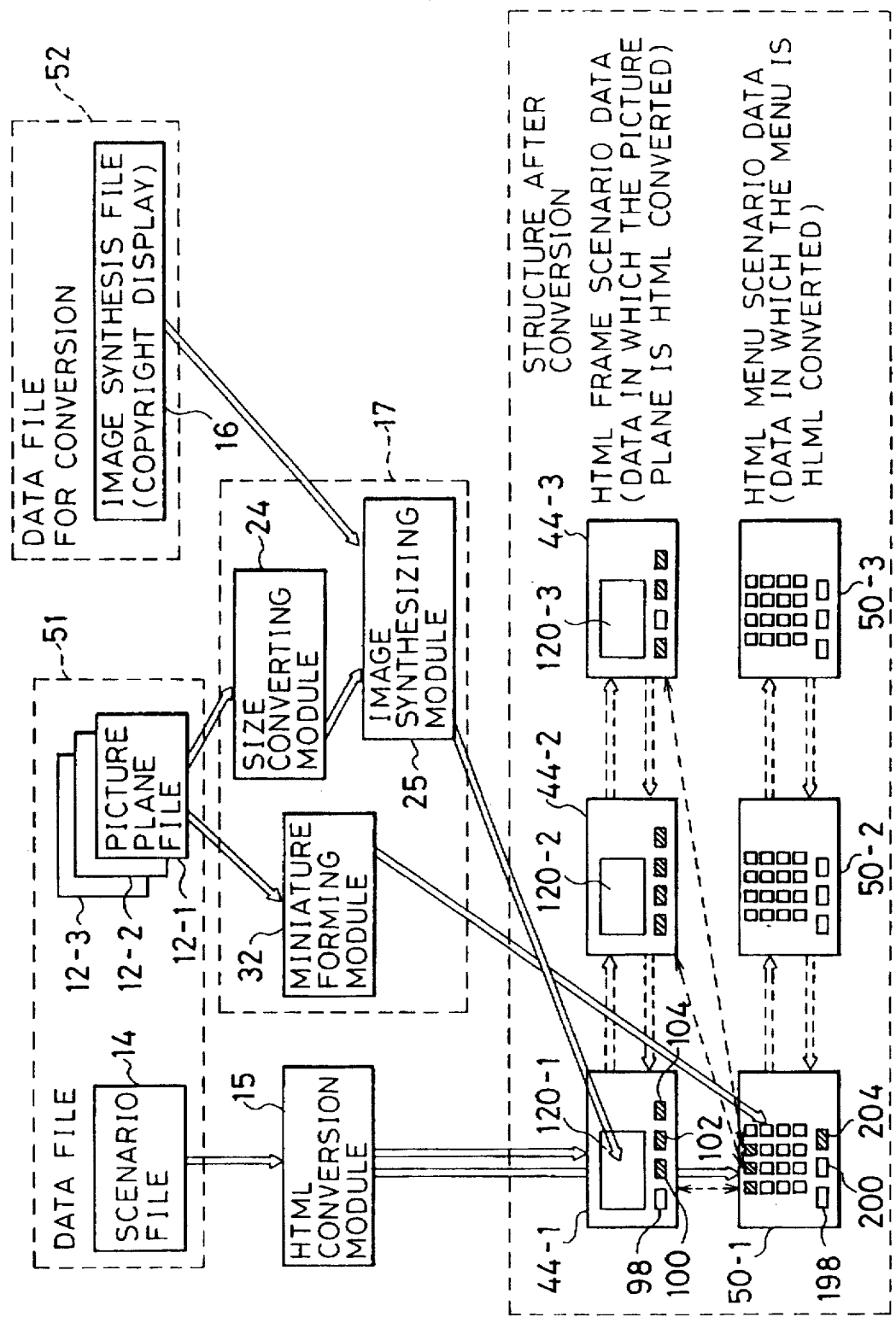
FIG. 2 is an explanatory diagram for a converting process of the invention.

To newly synthesize an image to the image data, an image synthesis file 16 is prepared and image data to be synthesized upon conversion is prepared in the image synthesis file 16. As image data to be synthesized, there is a copyright display that is synthesized to various operation button images which are used for switching the picture plane as necessary on a frame picture plane unit basis. In case of converting to the presentation data that can be used on the internet, the copyright display is retrieved from the user of each country in the world and there is a case where the copyright display is required in dependence on a country. Therefore, when the image data is converted to the GIF file format, the copyright display can be synthesized. For this purpose, a synthetic image reading module 30 is provided for the image synthesis file 16. After an image synthesizing module 25 synthesized an image to the image data obtained from the size converting module 24, the synthesized image data is stored into the picture plane conversion file 28 from the file outputting module 26. The scenario data stored in the scenario file 14 is read out on a frame unit basis by a frame reading module 38 and is converted to a scenario every frame described by the HTML file format by a frame converting module 40. The resultant scenario is called an HTML frame scenario data. The HTML frame scenario data is stored into a frame conversion file 44. In parallel with the conversion to the HTML frame scenario data, HTML menu scenario data to display a menu picture plane as a list display picture plane in which a plurality of frame picture planes are arranged is formed by a menu converting module 46. In the embodiment, one menu picture plane is formed by up to 16 picture planes. Namely, when the number of frame picture planes is equal to or less than 16, there is one menu picture plane. When the number of frame picture planes exceeds 16, two menu picture planes are formed and two HTML menu scenario data are also formed in correspondence to the two menu picture planes. When the number of processes of the frame picture planes reaches 16 or when the number of frame picture planes is equal to or less than 16 or in case of the final frame picture plane, the menu converting module 46 stores the HTML menu scenario data formed into a menu conversion file 50 by a file outputting module 48. In the embodiment, for simplicity of explanation, a function to form the HTML scenario data is separated to the frame converting module 40 and menu converting module 46 on the basis of the scenario file. In FIG. 2 showing the function, an HTML converting module 15 is shown by combining both of the modules 40 and 46. Namely, in the HTML converting module 15, the presentation data constructed by a plurality of picture plane data and the scenario data in which an instruction to display a list of a plurality of picture planes and a procedure to display the picture plane data have been stored is converted to the data format which is used on the network that is constructed by a text in which information which hierarchically defines the relations among the plurality of picture plane data has been stored. In parallel with the making of the HTML menu scenario data by the menu converting module 46, miniature image data which is used for the HTML menu picture plane is formed by a miniature forming module 32. When the image data is derived every frame from the picture plane reading module 22, the miniature forming module 32 converts the image data into miniature image data of a size such that 16 miniature image data can be arranged on one picture plane. The miniature image data obviously has a GIF file format which can be used on the internet. Each of the converted miniature image data is stored into a miniature picture plane file 36 by a file outputting module 34. When the number of frame picture planes is less than 16, the miniature forming module 32 can designate the conversion to the miniature picture planes of a size larger than the size of each of the 16 picture planes as necessary. For example, when the number of frame picture planes is equal to or less than 8, the image data is converted to the miniature picture planes each having a size that is twice as large as that in case of 16 picture planes. A menu converting function of the miniature forming module 32 and HTML converting module 15, namely, the function as a list display picture plane forming module is realized by the menu converting module 46 in FIG. 1.

FIG. 2 shows a state of the converting process by the conversion processing unit 10 in FIG. 1. First, as a data file 51, the scenario file 14 and picture plane files 12-1, 12-2, and 12-3 of a plurality of frames, for example, three frames are prepared. As a data file 52 for conversion, for instance, the image synthesis file 16 such as a copyright display or the like is prepared. As a converting process, first, with respect to the picture plane files 12-1, 12-2, and 12-3, the conversion to the image data of the GIF file format by the size converting module 24, image synthesizing module 25, and miniature forming module 32 provided for an image converting module 17 is executed. After the size converting module 24 performed the size change adapted to the picture plane size after completion of the conversion was performed as necessary, the image synthesizing module 25 synthesizes an image of, for example, the copyright display from the image synthesis file 16 as necessary, thereby forming an image 120-1 of the GIF file format that is used for display of a frame picture plane 44-1 in the structure after completion of the conversion. With respect to the remaining picture plane files 12-2 and 12-3 as well, images 120-2 and 120-3 of the GIF file format which are used for picture planes 44-2 and 44-3 after the conversion are formed in a manner similar to the above. In the miniature forming module 32, the picture plane files 12-1 to 12-3 are respectively converted to miniature picture planes 32-1, 32-2, and 32-3 which are used on a menu picture plane 50-1 after the conversion. The image data converted by the image synthesizing module 25 and miniature forming module 32 has been stored in the picture plane conversion file 28 and miniature picture plane file 36 as shown in FIG. 1 and is displayed on the picture plane on the basis of the frame scenario data and menu scenario data as conversion results of the scenario file 14, which will be explained hereinlater. The scenario file 14 provided in the data file 51 is converted to HTML frame scenario data every frame picture planes 44-1 to 44-3 and HTML menu scenario data every menu picture planes 50-1 to 50-3 by the HTML converting module 15. The HTML converting module 15 has a function in which the functions of the frame converting module 40 and menu converting module 46 provided for the conversion processing unit 10 in FIG. 1 are combined. On the basis of the HTML frame scenario data every frame derived by the HTML converting module 15, the first frame picture plane 44-1, second frame picture plane 44-2, and third frame picture plane 44-3 are displayed. The frame picture planes 44-1 to 44-3 display the images 120-1 to 120-3 by reading out from the picture plane data stored in the picture plane conversion file 28 in FIG. 1 and also display the images of the operation buttons to perform the link for the picture plane switching among the frame picture planes 44-1 to 44-3. As images of the operation buttons of the picture plane link, in the embodiment, as representatively shown in the frame picture plane 44-1, an image 98 of the operation button for switching to the previous picture plane, an image 100 of the operation button for switching to the next picture plane, an image 102 of the operation button for switching to the menu picture plane, and an image 104 of the operation button for switching to the calling source side picture plane are formed. In the embodiment, in each of the menu picture planes 50-1 to 50-3 which are formed on the basis of the HTML menu scenario data formed by the HTML converting module 15, 16 miniature picture planes can be arranged. For example, in case of the picture plane files 12-1 to 12-3 of three frames, three miniature picture planes shown by hatched portions in the menu picture plane 50-1 are displayed. With respect to the menu picture planes 50-1 to 50-3, the images of the operation buttons for performing the link to switch to the other menu picture plane are also displayed. As images of the operation buttons to switch the menu picture planes, in the embodiment, as representatively shown in the menu picture plane 50-1, an image 198 of the operation button to switch to the previous menu picture plane, an image 200 of the operation button to switch to the next menu picture plane, and an image 204 of the operation button to switch to the calling source side picture plane are formed. When there are three miniature picture planes, only the menu picture plane 50-1 is shown. In this case, only the image 204 of the operation button to switch to the calling source side picture plane is displayed. The converting process of FIG. 2 is executed on the basis of the setting of the parameters by the conversion parameter setting unit 20 in FIG. 1.

Figure 3:
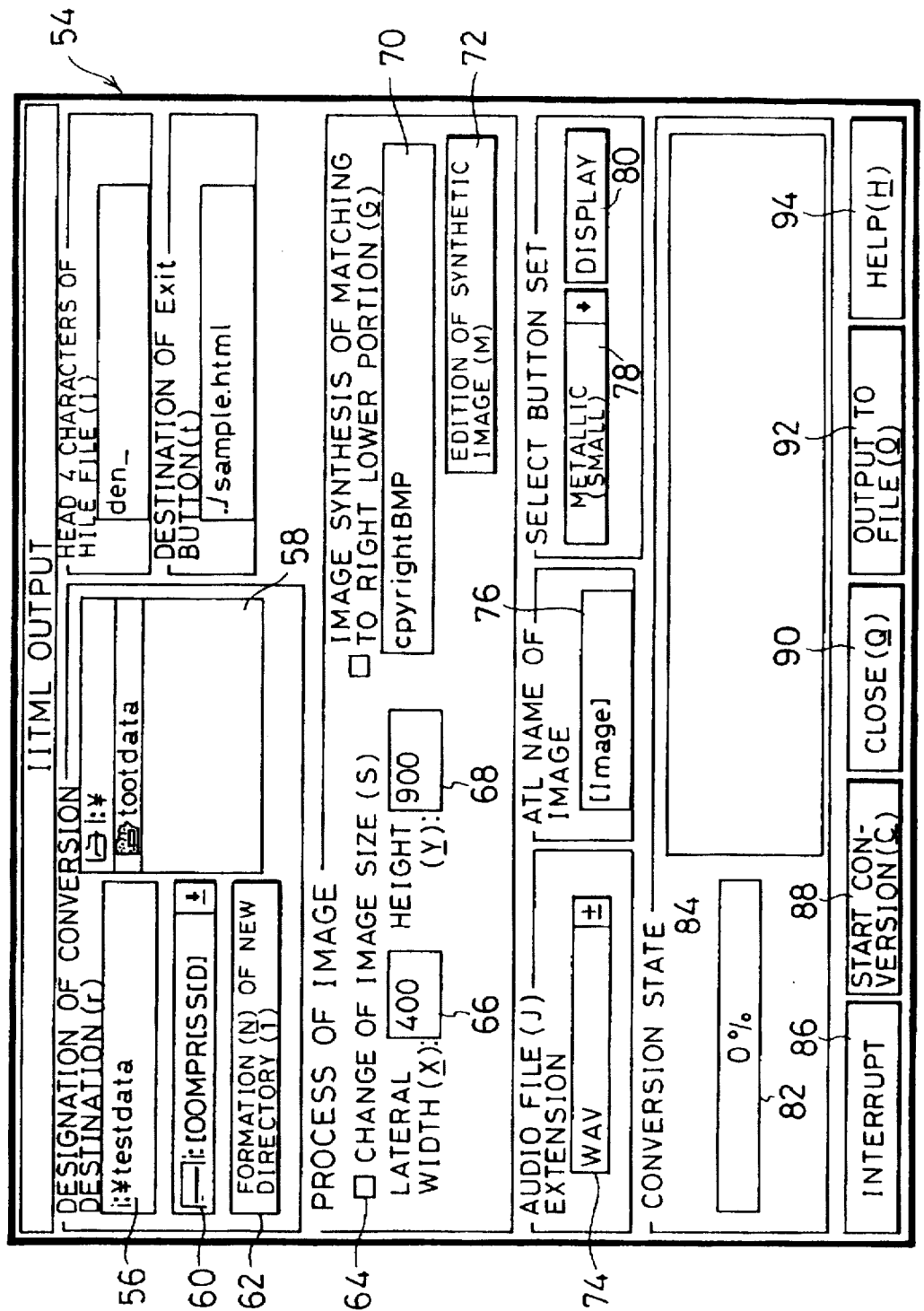
FIG. 3 is an explanatory diagram of a picture plane of a conversion parameter setting unit in FIG. 1.

FIG. 3 shows an embodiment of the conversion parameter setting unit 20 in FIG. 1 and shows an example in case of setting conversion parameters by using a parameter setting picture plane 54. A conversion destination designating frame 56 is provided at the left upper position of the parameter setting picture plane 54. The conversion processing unit 10 in FIG. 1 operates on the computer and the converted presentation data is preserved in a disk unit of the computer.

Therefore, a directory serving as a preservation destination of the data after the conversion is designated by the conversion destination designating frame 56. A conversion destination display frame 58 is provided on the right side of the conversion destination designating frame 56. A list of directories for preservation in the disk unit is displayed. By clicking the directory as a conversion destination, it is displayed as an inversion display as shown in the diagram. The conversion destination which is inversely displayed is set into the conversion destination designating frame 56. A new conversion destination display frame 60 and a new directory formation designating frame 62 are provided on the lower side of the conversion destination designating frame 56, thereby enabling a directory as a conversion destination to be newly formed. A size change designating frame 64 to set parameters for working an image is provided at the center of the parameter setting picture plane 54. A lateral width designating frame 66 and a height designating frame 68 are provided in correspondence to the size change designating frame 64. A display size of the converted image can be designated by using the size change designating frame 64. The display size is designated on a dot unit basis in the lateral width designating frame 66 and the height designating frame 68. For example, when the display size of the picture plane before conversion is equal to 640×480 dots, the display size of the picture plane after completion of the conversion is set to about 400×300 dots at which the picture plane can be easily seen. An image synthesis file name designating frame 70 and a synthesis image edition designating frame 72 for setting parameters of the image synthesis are provided on the right side of the size change designating frame 64. That is, when the name of the image synthesis file 16 describing the copyright display or the like in FIG. 1 is designated by the image synthesis file name designating frame 70, the contents of the copyright display read out from the image synthesis file 16 are overlaid to a predetermined position, for example, at the right lower position of each picture plane after completion of the conversion. In this case, when button display of the synthesis image edition designating frame 72 is clicked, for example, a drawing software is activated and the contents of the image file designated by the image synthesis file name designating frame 70 can be edited. In this case, the file name is set to, for example, "cpyright. BMP" and the contents of the image file in this case are set to, for example, "All Rights Reserved. Copyright(C) 1995". An audio extension designating frame 74 is provided on the lower side of the size change designating frame 64. The audio extension designating frame 74 designates an extension of an audio file which is reproduced at each picture plane. An image alternation character train designating frame 76 is provided on the right side of the audio extension designating frame 74. In the case where the presentation data converted by the present invention is retrieved by a system which can display only characters, a character train is displayed in place of an image at a position where an image is inherently displayed. The character train to be displayed in place of the image is designated by the image alternation character train designating frame 76. A button set selecting frame 78 and a selection button display designating frame 80 are provided on the right side of the image alternation character train designating frame 76. A picture plane which is formed after conversion to the presentation data of the GIF and HTML displays the images 98, 100, 102, and 104 of a plurality of operation buttons as shown in, for example, the frame picture plane 44-1 after completion of the conversion in FIG. 2. Since the images 98, 100, 102, and 104 of the operation buttons function as operation buttons for switching the frame picture plane by clicking the mouse, a design of the operation button displayed on the picture plane can be selected by the button set selecting frame 78. As a design of the operation button which can be selected by the button set selecting frame 78, there are four kinds of designs such as "simple", "metallic", "colorful", and "woody". "Simple" has a design such as a symbol format like a button of a video apparatus which can be easily understood. "Metallic" has a design of the bluish color which can be easily seen on the picture plane of the warmish color. "Colorful" has a design of a loud color which is matched with the picture plane of a gorgeous atmosphere. "Woody" has a design of the brownish color which is matched with the picture plane of a calm atmosphere. By selecting a desired one of the designs of the operation buttons which are displayed by the button set selecting frame 78 and operating the selection button display designating frame 80, the screen is switched to the display picture plane of the selected operation button and the contents can be confirmed. A bar graph display frame 82 and a message display frame 84 to display a conversion situation are provided on the lower side of the audio extension designating frame 74. A step-by-step bar graph display in which the value obtained by dividing 100% by the number of frame picture planes to be converted is set to one unit and a percentage display indicative of a progress of the conversion situation are performed in the bar graph display frame 82. For example, in case of converting eight frames, one frame is set to 12.5%, thereby displaying the progressing degree of the conversion situation on a unit basis of 12.5%. An elapse message indicative of the conversion situation is displayed in the message display frame 84. When an error occurs during the conversion, an error message is displayed. An interruption button 86, a conversion start button 88, a conversion end button 90, a file output button 92, and a help call button 94 are arranged on the lowest side of the parameter setting picture plane 54. The interruption button 86 is clicked in case of interrupting the conversion in the middle of the operation. By clicking the conversion start button 88 at the stage at which necessary set items are inputted to the parameter setting picture plane 54, the converting operation is started. By clicking the conversion end button 90 at the end of the conversion, the converting process is finished. By clicking the file output button 92, the information displayed in the message display frame 84 is outputted to the file. The help call button 94 displays notice items when the converted GIF and HTML data is registered into the WWW server.

Figure 4:
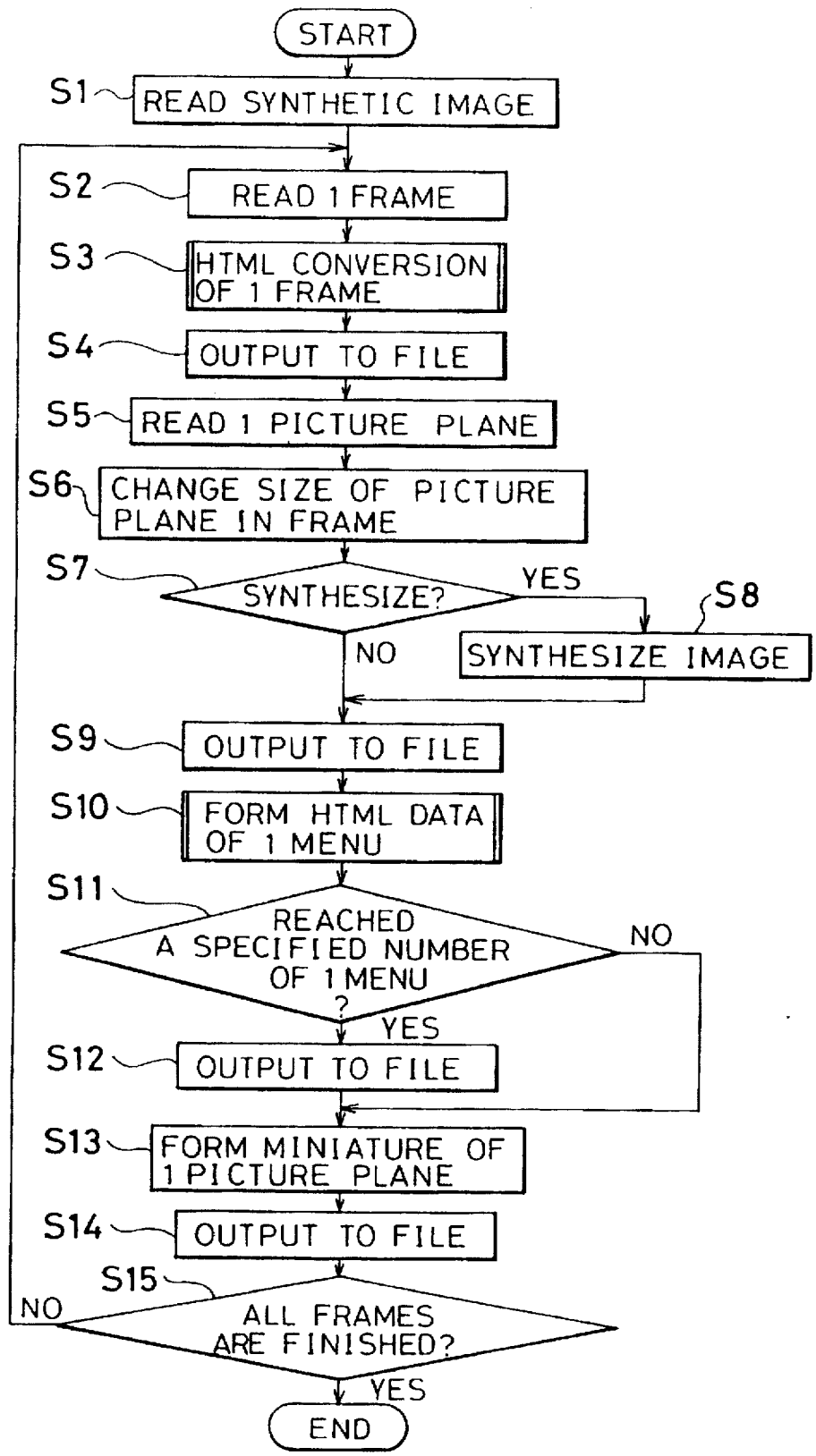
FIG. 4 is a general flowchart for the converting process of the invention.

FIG. 4 is a general flowchart of the process for converting the presentation data into the GIF and HTML data by the conversion processing unit 10 in FIG. 1. First in step S1, the synthetic image reading module 30 reads a synthetic image from the image synthesis file 16. In step S2, the frame reading module 38 reads the image of one frame from the scenario file 14. In step S3, the HTML conversion of one frame is performed, thereby forming HTML frame scenario data. The details of the conversion into the HTML frame scenario data of one frame will be clarified later in a flowchart of FIG. 11. After completion of the conversion to the HTML frame scenario data of one frame, the HTML frame scenario data is outputted to the frame conversion file 44 in step S4. In step S5, the image data of one picture plane is read out from the picture plane file 12 by the picture plane reading module 22. In step S6, the size converting module 24 changes the size of the picture plane in the frame. In step S7, the presence or absence of the image synthesis is judged. When the image synthesis is designated, the image synthesis is performed in step S8. Finally, the image data of the GIF file format is outputted and stored into the picture plane conversion file 28 in step S9. In step S10, the menu converting module 46 forms the HTML menu scenario data of one menu. The details of the process for forming the HTML menu scenario data of one menu will be clarified in a flowchart of FIG. 14 hereinlater. After completion of the making of the HTML menu scenario data based on the reading of the scenario file of one frame, a check is made in step S11 to see if the number of frames has reached the specified number (16) of frames of one menu or if the frame has reached the last frame or not. In the embodiment, since the number of miniature picture planes which can be arranged in one menu picture plane is equal to 16, when the number of frames is less than 16, the output to the menu converting file 50 in step S12 is not executed but step S13 follows. The miniature forming module 32 forms miniature picture planes of one picture plane. In step S14, the miniature picture planes are outputted to the miniature picture plane file 36. In step S15, a check is made to see if the processes of all frames have been finished or not. If NO, the processing routine is returned to step S2 and the converting process by the reading is executed to the next frame. The above processes are repeated until the frame number reaches 16 frames. When the processes for 16 frames are finished, the HTML menu scenario data is outputted to the file in step S12. When the frame number is less than 16 frames, the processes in steps S2 to S10 are repeated until the frame number reaches the last frame in step S11. When the frame number reaches the last frame, the HTML menu scenario data is outputted to the file in step S12.

Figure 5:
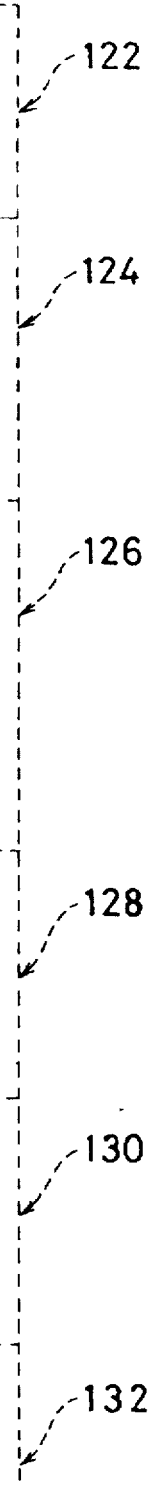
FIG. 5 is an explanatory diagram of scenario data of an SW3 file format before conversion.

FIG. 5 shows an example of scenario file data before conversion stored in the scenario file 14 in FIG. 1 and it is described by the SW3 file format. Subsequent to a head parameter setting field 122, the scenario file data before conversion is constructed by five frames: a first frame 124; a second frame 126, a third frame 128, a fourth frame 130; and a fifth frame 132. In the head parameter setting field 122, a version "V3.0L20" is set at the second line. A digital motion image "MPEG REELMAGIC" is set at the fourth line. A timer setting time "2" for an automatic demonstration is set at the next fifth line. A picture plane background color "BLACK" is set at the last line. With respect to the first to fifth frames 124 to 132, for example, when considering the first frame 124, a label "TEIAN90. TIF(1)" and a picture plane file name "TEIAN90. TIF" and, as a display effect, two "OPEN HORIZONTAL NORMAL" and "NOEFFECT" are set between a code "#FRAME" indicative of the start position and a code "#END" indicative of the end position. "OFF" indicating that an automatic demonstration timer has timed over is described at the last position. This point is also fundamentally the same with respect to the other second to fifth frames 126 to 132. In the second frame 126, a file name "MPEG D:\ASIACTY 144 120 495 359" to display a digital motion image is displayed at the seventh line.

As for the scenario data before conversion shown in FIG. 5 as mentioned above, for example, the first frame 124 in FIG. 5 is converted to HTML frame scenario data in FIG. 6 by the process of the frame converting module 40 provided for the conversion processing unit 10 in FIG. 1. The second frame 126 is converted to the HTML frame scenario data in FIG. 7. First, when considering the HTML frame scenario data of the first frame in FIG. 6, the contents conform with an HTML grammar in FIG. 8. The first line shows a title setting of the HTML frame scenario data. The title setting is displayed in a title column of a retrieval tool of the WWW server. In case of FIG. 6, the title setting is set to "1/6". The second line shows a description of notes. In case of FIG. 6, the year, month, and day of the making are described. The third and fourth lines show a description for calling the designated frame picture plane when the image that is displayed on the picture plane is clicked. Namely, "den 002. html" is described at the third line as a file name of the frame picture plane which is called by clicking the image which is displayed on the current picture plane. The file name is a file name of the second frame picture plane as a next picture plane. "IMG" is described at the fourth line as an alternation character train to be displayed in place of an image for the system which cannot display an image. An image file name "teian90. gif" which is displayed on the current picture plane of the first frame is described after "IMG". </a> at the fifth line is described at the last position.

Figure 9:
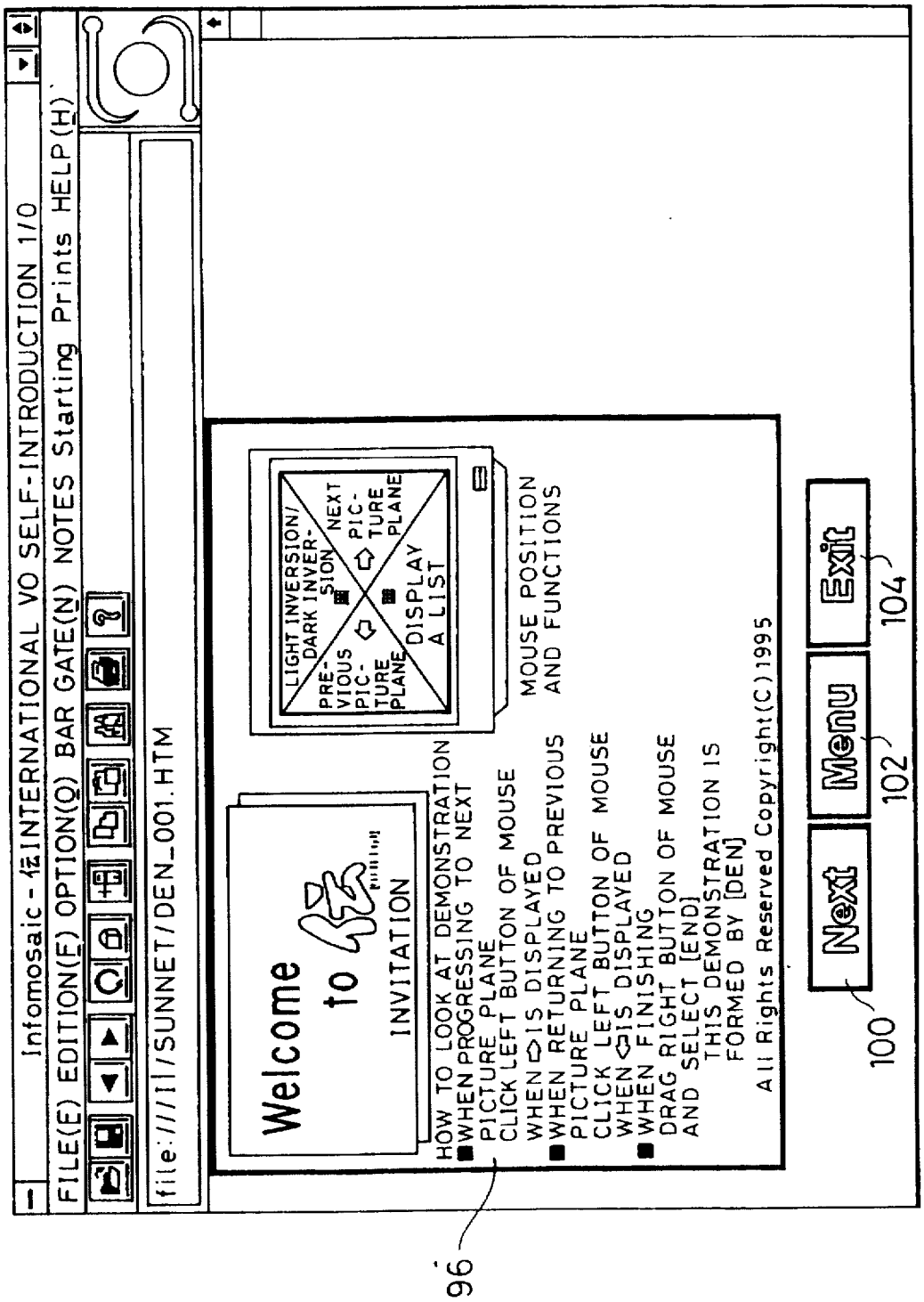
FIG. 9 is an explanatory diagram of a picture plane according to the HTML frame scenario data of the first frame in FIG. 6.

FIG. 9 shows the first frame picture plane obtained in accordance with the HTML frame scenario data in FIG. 6. An image 96 read out by the image file name "teian90. gif" at the fourth line is displayed.

Referring again to FIG. 6, the sixth line shows a line change (new-line) designation. The subsequent seventh line shows a paragraph change (new paragraph). The eighth to eleventh lines show a description to display the images of the operation buttons for switching the picture plane. First, the eighth line relates to the display of the operation button to switch to the previous picture plane. Since the previous picture plane doesn't exist with respect to the first frame, a dummy file name is described. Namely, with regard to the first alternation character train, it is set to a blank. As a next image file name, a file name which never exists is described like a dummy file name "btn void. gif". Therefore, the image of the operation button to switch to the previous picture plane is not displayed. The ninth line shows a description to display the image 100 of the operation button to the next picture plane in FIG. 10. In a manner similar to the third to fifth lines, there is a description for clicking the image to be displayed on the picture plane and for reading out the designated file. Namely, subsequent to a designated file name "den 002. html" to call by clicking the image, an alternation character train "Next" of the image is described. An image file name "btn next. gif" to display the operation button image 100 onto the current picture plane is described at the last position. Image files to display the three operation button images 100, 102, and 104 in FIG. 9 at the ninth to eleventh lines are prepared as an image synthesis file 16 in FIG. 1. A file name "den 002. html" which is called by clicking the image at the eighth line relates to the second frame picture plane.

The menu picture plane and the file names of the frame picture planes are summarized as follows.
Menu picture plane : "den m001. html"
1st frame picture plane : "den 001. html"
2nd frame picture plane : "den 002. html"
3rd frame picture plane : "den 003. html"
4th frame picture plane : "den 004. html"
5th frame picture plane : "den 005. html"
Calling source side picture plane : "DENDEM 01. html"

From the relations among the file names as mentioned above, the ninth line in FIG. 6 describes the switching to the one-preceding first frame picture plane by clicking the operation button image 102 in FIG. 9. The eleventh line describes a switching to the calling source side picture plane by clicking the operation button image 104 in FIG. 9.

Figure 10:
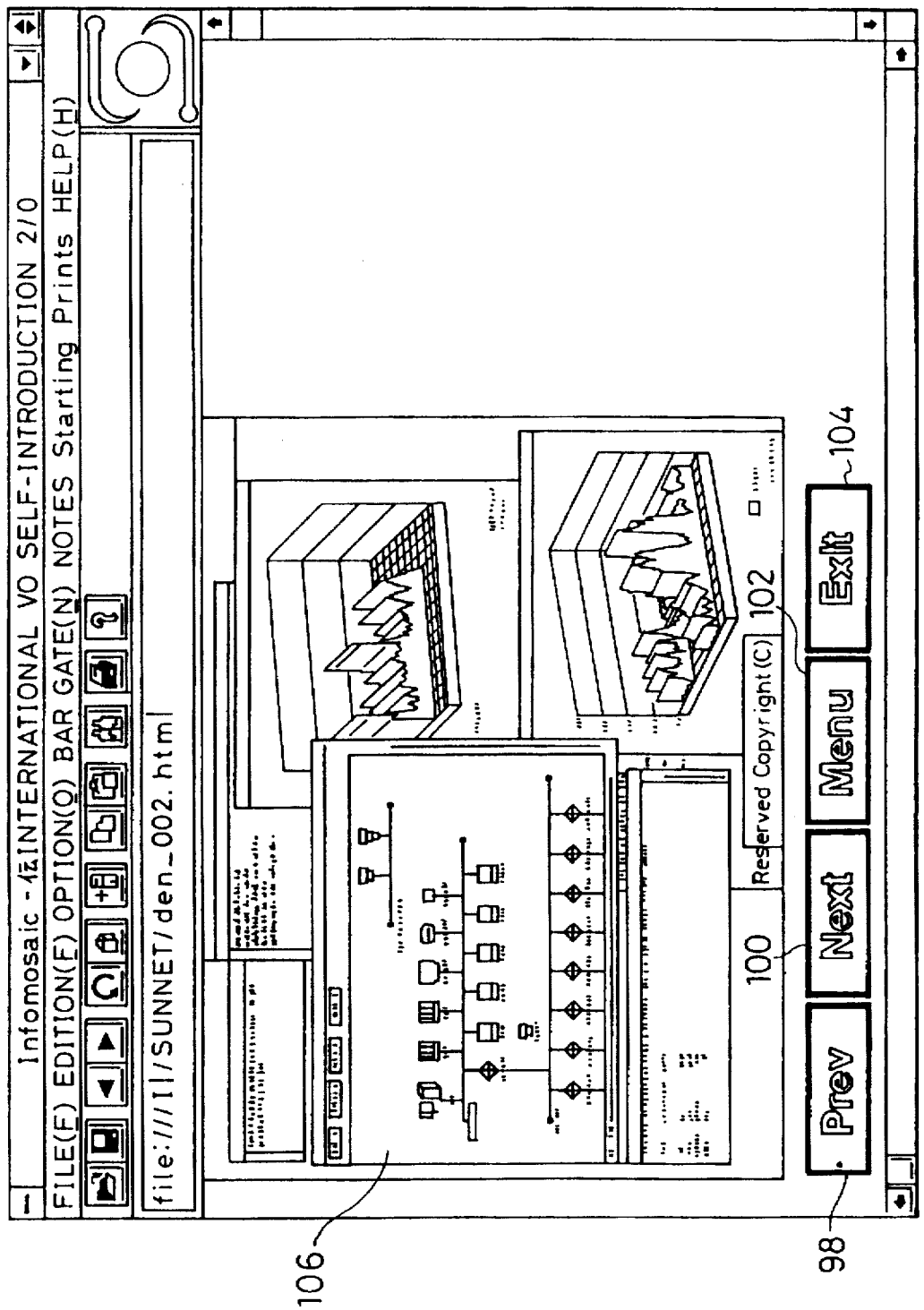
FIG. 10 is an explanatory diagram of a picture plane according to the HTML frame scenario data of the second frame in FIG. 7.

The description of the HTML frame scenario data of the second frame in FIG. 7 corresponds to the second frame picture plane in FIG. 10. With respect to the first to seventh lines in FIG. 7, the contents are fundamentally the same as those of the first frame in FIG. 6. With regard to the eighth line, however, since the first frame picture plane exists as a previous picture plane, the designation of the first frame picture plane as a switching destination picture plane corresponding to the operation button image 98 in FIG. 10 and the designation of the file name to display the operation button image 98 are executed. The switching to the next picture plane at the ninth line is designated so as to switch to the third frame picture plane. With respect to the remaining third, fourth, and fifth frame picture planes as well, HTML frame scenario data similar to those of the first and second frame picture planes in FIGS. 6 and 7 is formed. Among them, since the next picture plane doesn't exist with respect to the fifth frame as a last frame, for example, the switching designation of the next picture plane at the ninth line in the first frame in FIG. 6 is set to the dummy file name.

Figure 11:
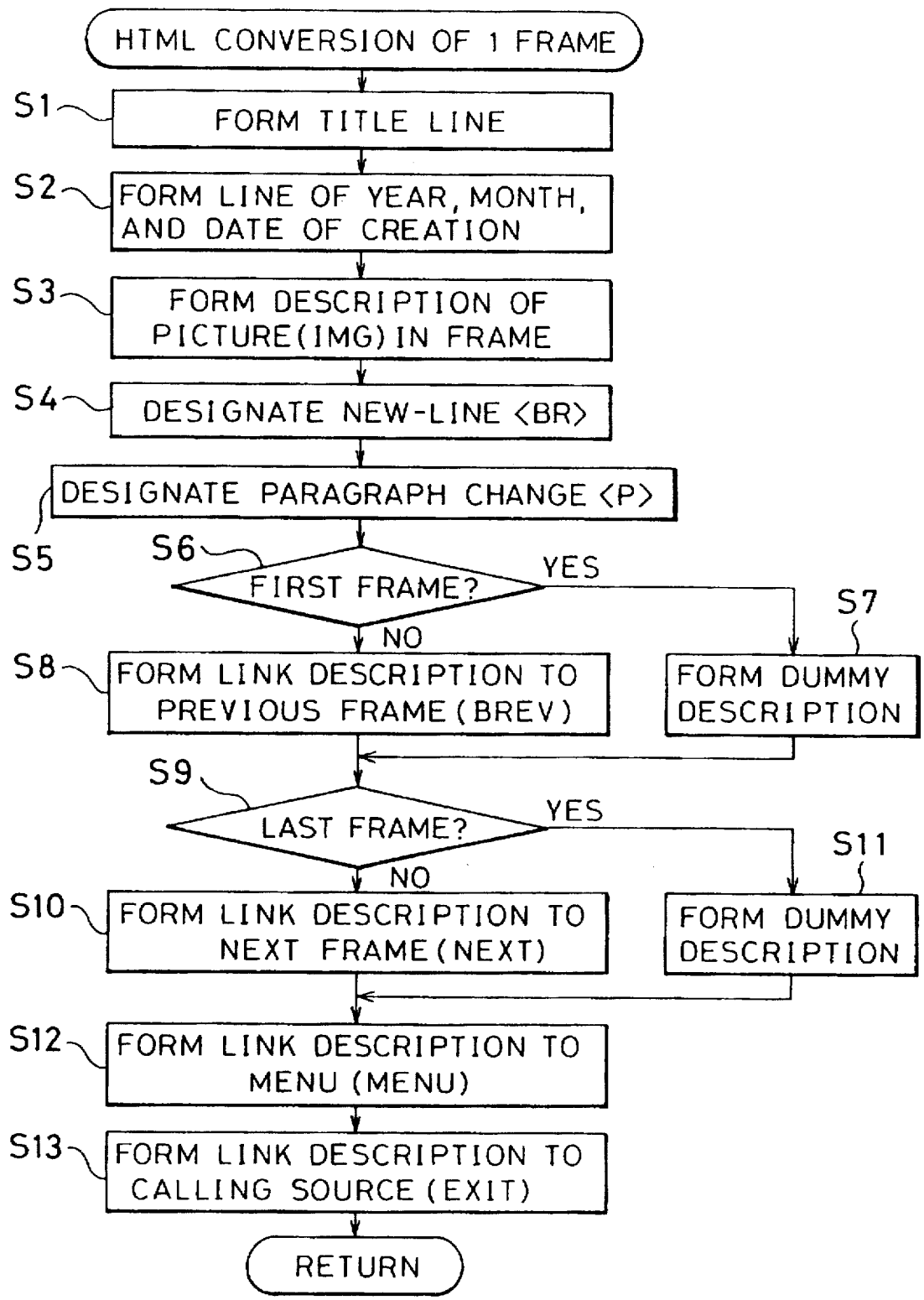
FIG. 11 is a flowchart for conversion to the HTML frame scenario data of one frame according to the invention.

The flowchart of FIG. 11 shows the details of the conversion to the HTML frame scenario data of one frame of the invention. In step S1, a title line is formed. In step S2, a making year/month/day line is formed. In step S3, a file description into the frame is formed. Namely, by clicking the image which is displayed on the picture plane, a file name to call the designated frame picture plane is described. In step S4, the line change is designated. In step S5, the paragraph change is designated. In step S6, a check is made to see if the frame is the first frame or not. If it is the first frame, since no previous picture plane exists, in step S7, a description of a dummy is formed with respect to the description regarding the switching to the previous picture plane. If NO, a description to switch to the previous picture plane is formed. In step S9, a check is made to see if the frame is the last frame or not. If NO, a link to the next frame is formed in step S10, namely, a description to switch to the next picture plane is formed. When it is the last frame, a description of a dummy is formed in step S11. In step S12, a description of a link to the menu picture plane is formed. In step S13, a description of a link to the calling source side picture plane is finally formed.

Figure 13:
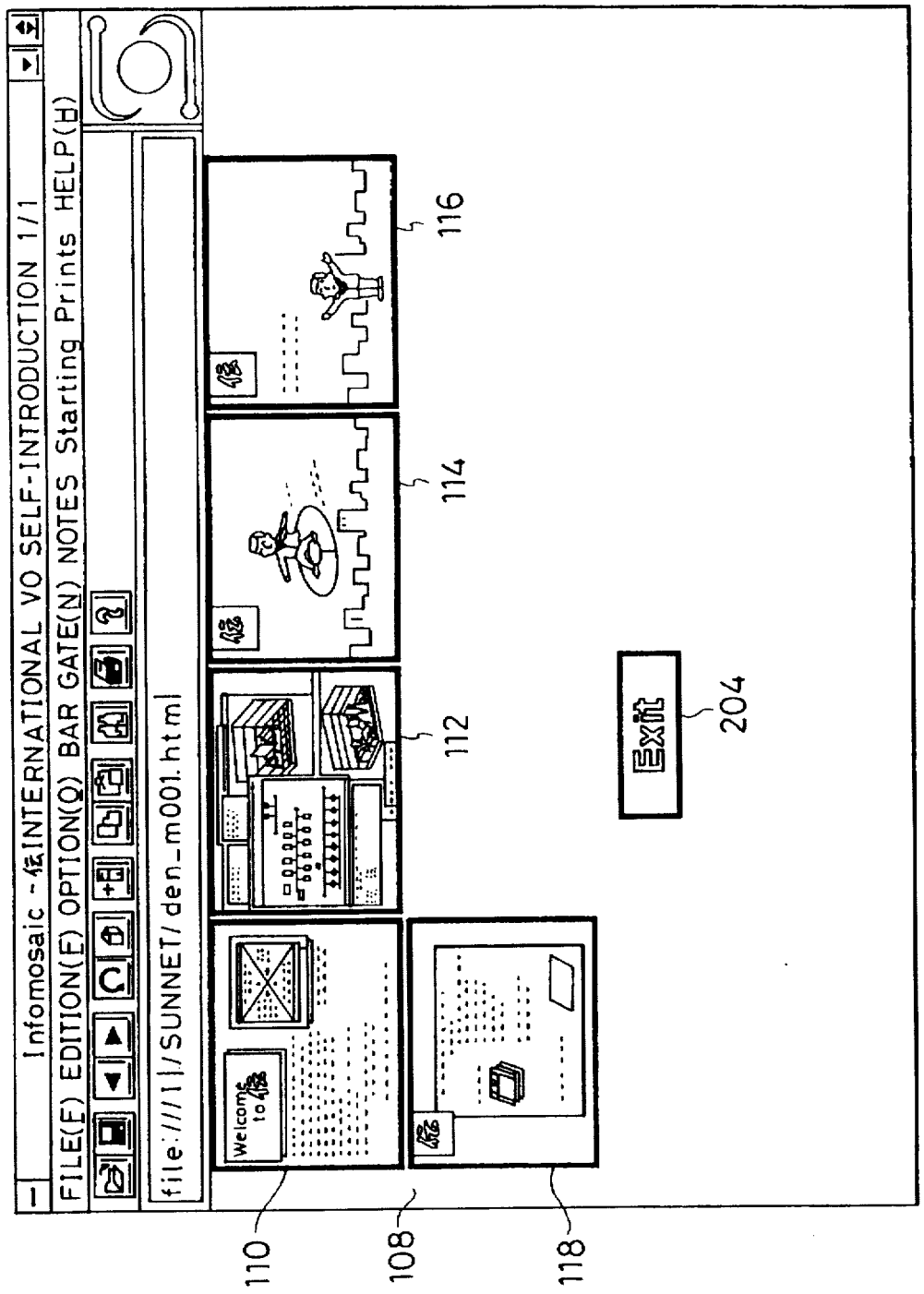
FIG. 13 is an explanatory diagram of a menu picture plane according to the HTML menu scenario data in FIG. 12.

FIG. 12 is a diagram showing HTML menu scenario data of one menu formed on the basis of the scenario file data before conversion in FIG. 5. FIG. 13 shows a menu picture plane displayed on the basis of the HTML menu scenario data in FIG. 12. The HTML menu file data in FIG. 12 is constructed by a title portion 140, miniature picture plane fields 142 to 150 of the first to fifth frames and an operation button display field 152. A title "MENU 1/1" is described in the head title field 142. Subsequently, year/month/day of the making are described as a sentence of notes. A description to call the designated HTML file by clicking the miniature picture planes which are displayed on the picture plane and a description of a file name to display the miniature picture plane are formed in the miniature picture plane field 142 of the first frame. Namely, a file name "den 001. html" of the first frame picture plane is described as an HTML file name which is called by clicking the image. Subsequent to an alternation character train "Image m001" of the miniature picture plane, an image file name "den m001. gif" of the miniature picture plane is described. By the description of the miniature picture plane field 142 of the first frame, a miniature picture plane 110 in the menu picture plane in FIG. 13 is displayed. In a manner similar to the above, a description is made with respect to each of the other miniature picture plane fields 144, 146, 148, and 150 of the second to fifth frames in FIG. 13. Miniature picture planes 112, 114, 116, and 118 of the first to fifth frames are displayed in FIG. 12. A description to switch to the previous menu picture plane, next menu picture plane, and calling source side picture plane is made in the last operation button display field 152. In the embodiment, the number of frames is equal to 5 and the number of menu picture planes is equal to 1. Therefore, a dummy file name is described with respect to the description regarding the switching to the previous menu picture plane and the next menu picture plane in the operation button display field 152. A valid file name is described with regard to only the switching to the calling source side picture plane at the third line. Thus, only the operation button image 104 for switching to the calling source side picture plane is displayed on the menu picture plane of FIG. 12.

The flowchart of FIG. 14 shows the conversion to the HTML menu scenario data of one menu in the invention. In step S1, a check is made to see if the frame is the first frame or not. If YES, a title line is formed in step S2. In step S3, data of the making year/month/day is formed. In step S4, a description of a link of a file name of the frame image serving as a source of the miniature image is formed. In step S5, a description of the miniature image is formed. In step S6, a check is made to see if four miniature picture planes have been arranged in the lateral direction or not. If NO, step S8 follows. When four miniature picture planes are arranged, a line change is designated in step S7 and step S8 follows. In step S8, a check is made to see if the number of frames is equal to the specified number (16) of picture planes to be arranged in one menu or if the frame is the last frame or not. When the frame number is less than the specified number or the frame is not the last frame, the processing routine is returned to the main routine in FIG. 4 and the process of the next frame is executed. When the number of miniature picture planes reaches the specified number 16 or when the frame is the last frame, step S9 follows and the line change is designated. After that, a paragraph change is designated in step S10. The images of the operation buttons are described by the processes in step S11 and subsequent steps. Namely, a check is made in step S11 to see if the picture plane is the first menu picture plane or not. If YES, in step S12, a description of a dummy is formed with respect to the image of the operation button to switch to the previous menu picture plane. With regard to the second and subsequent menu picture planes, a description of a link to the previous menu picture plane is formed in step S13. A check is made in step S14 to see if the picture plane is the last menu picture plane or not. If NO, a description of a link to the next menu picture plane is formed in step S15. When the picture plane is the last menu picture plane, a description of a dummy is formed in step S16. In step S17, a description of a link to the calling source side picture plane is finally formed. Such a presentation data converting apparatus of the present invention is provided as a software tool using a personal computer as an operation environment. Specifically speaking, the apparatus can be used by installing to a computer apparatus which operates in the Windows 3.1 such as FMV and FMTOWNS series made by Fujitsu Ltd. or the like According to the present invention as described above, even presentation data formed on the computer by the user who doesn't have an expert knowledge such as an HTML or the like which can be used in the WWW server of the internet, the data can be distributed onto the network such as an internet or the like and can be effectively used. Since the visual menu picture plane (list display picture plane) used in the presentation on the computer can be realized on the network such as an internet or the like, the necessary presentation data can be effectively retrieved and used on the network without losing the function of the original presentation. Further, in the case where the presentation data is distributed onto the network such as an internet or the like, it is retrieved from each country in the world. In this case, for preparation of a retrieval from a country which needs to clarify a copyright display, the copyright display can be automatically synthesized to the picture plane upon conversion. The contents of the picture plane of the presentation that can be distributed by the worldwide network can be efficiently formed.

Although the above embodiment has been shown and described with respect to the conversion to the GIF and HTML file formats in the WWW server which is used in the internet as an example, with respect to the conversion to other proper file formats which can be used on the network, the conversion of similar presentation data according to each grammatical rule can be realized.

What is claimed is:

1. A converting apparatus of presentation data, in which presentation data constructed by a plurality of picture plane data formed by a presentation forming tool and scenario data in which an instruction to display a list of said plurality of picture planes and a procedure to display said picture plane data have been stored is converted into a data format which is used on a network constructed by a text in which information which hierarchically defines relations among said plurality of picture plane data has been stored, comprising:

a picture plane data forming module for forming the picture plane data on said network on the basis of said plurality of picture plane data before said conversion;

a list display picture plane forming module for forming image data of a list display picture plane on the basis of the instruction information to display the list of said plurality of picture planes in said scenario data; and a frame converting module for forming text data which is used on said network having a file name to call each of the picture plane data and link information to another picture plane with respect to said plurality of picture planes and said list display picture plane on the basis of the procedure information to display said picture plane data in said scenario data.

2. An apparatus according to claim 1, wherein said picture plane data forming module and said list display picture plane forming module convert each of said image data into image data of a GIF (Graphics Interchange Format) file format which can be used on the network, and said frame converting module forms data of an HTML (Hyper Text Markup Language) file format which can be used on said network as said text data.

3. An apparatus according to claim 1, wherein said frame converting module forms a file name, as said link information, to display an image of an operation button which links to each of a previous picture plane, a next picture plane, a list display picture plane, and a calling source side picture plane as necessary.

4. An apparatus according to claim 3, wherein in case of a first frame, said frame converting module forms the designation information of the file name to display the image of the operation button which links to each of the next picture plane, list display picture plane, and calling source side picture plane and also forms a dummy file name to display nothing as an image of the operation button which links to the previous picture plane.

5. An apparatus according to claim 3, wherein in case of a last frame, said frame converting module forms the file name to display a switch image which links to each of the previous picture plane, list display picture plane, and calling source side picture plane and forms a dummy file name to display nothing as an image of the operation button which links to the next picture plane.

6. An apparatus according to claim 1, wherein said list display picture plane forming module comprises:

a miniature picture plane converting module for converting each of said picture planes before the conversion into image data of miniature picture planes which can be arranged on said list display picture plane; and a list display converting module for forming a file name to arrange and display said plurality of miniature picture planes onto the list display picture plane, link information to the frame picture plane to which each of said miniature picture planes links, and link information to another list display picture plane on the basis of the instruction information to display the list of said plurality of picture planes in said scenario data.

7. An apparatus according to claim 6, wherein as link information to frame picture planes to which said miniature picture planes link, said list display converting module forms an image file name to display the image data onto said frame picture plane and reads out the picture plane data which is designated by said image file name when a portion of said miniature picture plane is clicked.

8. An apparatus according to claim 6, wherein in the case where the number of said miniature picture planes to be arranged on said list display picture plane exceeds a predetermined number, said list display converting module forms text data of another list display picture plane.

9. An apparatus according to claim 8, wherein as link information of said list display picture plane, said list display converting module forms, as necessary, the file name of the image of the operation button which links to each of the previous picture plane of the list display, the next picture plane of the list display, and the calling source side picture plane.

10. An apparatus according to claim 9, wherein in case of the first list display picture plane, said list display converting module forms the file name to display the image of the operation button which links to the calling source side picture plane and also forms a dummy file name to display nothing as images of the operation buttons which link to the previous picture plane of the list display and the next picture plane of the list display.

11. An apparatus according to claim 9, wherein in case of the last list display picture plane, said list display converting module forms the file name to display the image of the operation button which links to each of the previous picture plane and the calling source side picture plane of the list display and also forms a dummy file name to display nothing as an image of the operation button which links to the next picture plane of the list display.

12. An apparatus according to claim 1, further having a conversion parameter setting unit for setting various parameters necessary for conversion onto the picture plane.

13. An apparatus according to claim 12, wherein said conversion parameter setting unit has at least:

a conversion file name designating portion to designate the converted file name;

a conversion destination designating portion to designate a directory to preserve the converted data;

a calling source side designating portion to designate a file name on the calling source side;

an image size designating portion to designate a display size of the converted image;

an operation designating portion to designate an operation for start, interruption, end, or the like of the conversion; and an alternation name designating portion to designate a character train which is used for an alternation display of the image.

14. An apparatus according to claim 12, wherein said conversion parameter setting module further has:
   an audio file designating portion to designate an extension of an audio file that is reproduced on each of the frame picture planes; and
   a button set selecting portion to select a kind of image of the operation button which is used for linking of the frames.

15. An apparatus according to claim 1, further having:
   an image synthesizing module for synthesizing image data of new information whose addition is instructed upon formation of the picture plane data by said picture plane data forming module.

16. An apparatus according to claim 15, wherein said image synthesizing module reads out the additional information stored in an image synthesis file which has been prepared and synthesizes said additional information to the image data of the picture plane.

17. An apparatus according to claim 15, wherein said image synthesizing module synthesizes copyright information to the image data of said picture plane.

18. A converting method of presentation data, in which presentation data constructed by a plurality of picture plane data formed by a presentation forming tool and scenario data in which an instruction to display a list of said plurality of picture planes and a procedure to display said picture plane data have been stored is converted into a data format which is used on a network constructed by a text in which information which hierarchically defines relations among said plurality of picture plane data has been stored, comprising:
   a picture plane data forming step of forming the picture plane data on said network on the basis of said plurality of picture plane data before said conversion;
   a list display picture plane forming step of forming image data of a list display picture plane on the basis of the instruction information to display the list of said plurality of picture planes in said scenario data; and
   a frame converting step of forming text data which is used on said network having a file name to call each of the picture plane data and link information to another picture plane with respect to said plurality of picture planes and said list display picture plane formed in said list display picture plane forming step on the basis of the procedure information to display said picture plane data in said scenario data.

19. A method according to claim 18, wherein in said picture plane data forming step and said list display picture plane forming step, each of said image data is converted into data of a GIF (Graphics Interchange Format) file format which can be used on the network, and in said frame converting step, data of an HTML (Hyper Text Markup Language) file format which can be used on said network is formed as said text data.

20. A method according to claim 18, wherein in said frame converting step, a file name to display an image of an operation button which links to each of a previous picture plane, a next picture plane, a list display picture plane, and a calling source side picture plane is formed as said link information as necessary.

21. A method according to claim 20, wherein in said frame converting step, in case of a first frame, the designation information of the file name to display the image of the operation button which links to each of the next picture plane, list display picture plane, and calling source side picture plane is formed and a dummy file name to display nothing as an image of the operation button which links to the previous picture plane is also formed.

22. A method according to claim 20, wherein in said frame converting step, in case of a last frame, the file name to display the image of the operation button which links to each of the previous picture plane, list display picture plane, and calling source side picture plane is formed and a dummy file name to display nothing as an image of the operation button which links to the next picture plane is also formed.

23. A method according to claim 18, wherein said list display picture plane forming step comprises:
   a miniature picture plane converting step of converting each of said picture planes before the conversion into image data of miniature picture planes which can be arranged on said list display picture plane; and
   a list display converting step of forming a file name to arrange and display said plurality of miniature picture planes onto the list display picture plane, link information to the frame picture plane to which each of said miniature picture planes links, and link information to another list display picture plane on the basis of the instruction information to display the list of said plurality of picture planes in said scenario data.

24. A method according to claim 23, wherein as link information to frame picture planes to which said miniature picture planes link, in said list display converting step, an image file name to display the image data is formed on said frame picture plane and the picture plane data which is designated by said image file name is read out and displayed when a portion of said miniature picture plane is clicked.

25. A method according to claim 24, wherein in said list display converting step, in the case where the number of said miniature picture planes to be arranged on said list display picture plane exceeds a predetermined number, another list display picture plane is formed.

26. A method according to claim 25, wherein in said list display converting step, as link information of said list display picture plane, the file name of the image of the operation button which links to each of the previous picture plane of the list display, the next picture plane of the list display, and the calling source side picture plane is formed as necessary.

27. A method according to claim 25, wherein in said list display converting step, in case of the first list display picture plane, the file name to display the image of the operation button which links to the calling source side picture plane is formed and a dummy file name to display nothing as images of the operation buttons which link to the previous picture plane of the list display and the next picture plane of the list display is also formed.

28. A method according to claim 25, wherein in said list display converting step, in case of the last list display picture plane, the file name to display the image of the operation button which links to each of the previous picture plane and the calling source side picture plane of the list display is formed and a dummy file name to display nothing as an image of the operation button which links to the next picture plane of the list display is also formed.

29. A method according to claim 18, further having a conversion parameter setting step of setting various parameters necessary for conversion onto the picture plane.

30. A method according to claim 29, wherein said conversion parameter setting step has at least:
   a conversion file name designating step of designating the converted file name;

a conversion destination designating step of designating a directory to preserve the converted data;

a calling source side designating step of designating a file name on the calling source side;

an image size designating step of designating a display size of the converted image;

an operation designating step of designating an operation for start, interruption, end, or the like of the conversion; and an alternation name designating step of designating a character train which is used for an alternation display of the image.

31. A method according to claim 29, wherein said conversion parameter setting step further has:

an audio file designating step of designating an extension of an audio file that is reproduced on each of the frame picture planes; and a button set selecting step of selecting a kind of image of the operation button which is used for linking of the frame.

32. A method according to claim 18, further having:

an image synthesizing step of synthesizing image data of new information whose addition is instructed upon formation of the picture plane data in said picture plane data forming step.

33. A method according to claim 32, wherein in said image synthesizing step, the additional information stored in an image synthesis file which has been prepared is read out and synthesized to the image data of the picture plane.

34. A method according to claim 32, wherein in said image synthesizing step, copyright information is synthesized to the image data of said picture plane.

* * * * *